(12) United States Patent
Cornelius et al.

(10) Patent No.: US 8,745,430 B2
(45) Date of Patent: Jun. 3, 2014

(54) CLOCK SYNCHRONIZATION ACROSS AN INTERFACE WITH AN INTERMITTENT CLOCK SIGNAL

(75) Inventors: William P. Cornelius, Saratoga, CA (US); William O. Ferry, San Jose, CA (US); Girault W. Jones, San Jose, CA (US)

(73) Assignee: Apple Inc., Cupertino, CA (US)

( * ) Notice: Subject to any disclaimer, the term of this patent is extended or adjusted under 35 U.S.C. 154(b) by 312 days.

(21) Appl. No.: 13/095,607

(22) Filed: Apr. 27, 2011

(65) Prior Publication Data

US 2012/0278645 A1 Nov. 1, 2012

(51) Int. Cl.
G06F 1/12 (2006.01)
G06F 1/04 (2006.01)

(52) U.S. Cl.
USPC .......................................... 713/400; 713/503

(58) Field of Classification Search
None
See application file for complete search history.

(56) References Cited

U.S. PATENT DOCUMENTS

| 7,003,309 B2 | 2/2006 | Suzuki |
| 7,272,152 B2 | 9/2007 | Gross |
| 7,761,726 B2 | 7/2010 | Swaney |
| 7,797,561 B1 | 9/2010 | Abdalla |
| 2003/0223523 A1* | 12/2003 | Takaki ......................... 375/354 |
| 2007/0009075 A1* | 1/2007 | Miller et al. ................. 375/371 |
| 2008/0168470 A1* | 7/2008 | Bushell et al. ............... 719/313 |
| 2010/0220748 A1 | 9/2010 | Inomata |

FOREIGN PATENT DOCUMENTS

WO 2010079460 7/2010

OTHER PUBLICATIONS

Roesner, Franziska, et al. "HTTP-Level Deduplication with HTML5", Network Class Project, Spring 2010.

* cited by examiner

*Primary Examiner* — Mohammed Rehman
*Assistant Examiner* — Vincent Chang
(74) *Attorney, Agent, or Firm* — Park, Vaughan, Fleming & Dowler LLP; Chia-Hsin Suen

(57) ABSTRACT

The disclosed embodiments provide a system that facilitates synchronization between a first component and a second component connected to the first component via an interface in a computer system. During an active state of the interface, the system uses a local time base in the second component to generate a local clock signal that tracks a host clock signal from the first component. Next, during an inactive state of the interface, the system uses the local time base to maintain the local clock signal at the second component. Finally, during a subsequent active state of the interface after the inactive state, the system adjusts the local clock signal to remove clock drift between the local clock signal and the host clock signal.

22 Claims, 4 Drawing Sheets

CLOCK SYNCHRONIZATION ACROSS AN INTERFACE WITH AN INTERMITTENT CLOCK SIGNAL

BACKGROUND

1. Field

The disclosed embodiments relate to techniques for synchronizing clocks in computer systems. More specifically, the disclosed embodiments relate to techniques for synchronizing clocks between computer system components which are connected via an interface with an intermittent clock signal.

2. Related Art

A modern computer system typically includes a motherboard and a set of peripheral components connected to the motherboard via a variety of interfaces. For example, a Serial Advanced Technology Attachment (SATA) interface may facilitate data transfer between a storage device (e.g., hard disk drive, optical drive, etc.) and the motherboard, while a Peripheral Component Interconnect Express (PCIe) bus may enable communication between a central-processing unit (CPU) on the motherboard and a graphics-processing unit (GPU) on a graphics card.

Moreover, multiple clock signals may be used to control the execution of various interface-connected components within the computer system. For example, a 100 MHz system clock may synchronize the execution of processors, memory, and/or integrated components on the motherboard, while a separate GPU clock may synchronize graphics processing and rendering on the graphics card. Because the motherboard and graphics card are controlled by different clock signals, signals may cross clock domains (e.g., graphics-rendering data and commands) as they are transmitted between the motherboard and graphics card (e.g., over the PCIe bus).

To facilitate communication between such interface-connected components, sample-rate conversion may be performed at each clock domain crossing in the computer system. For example, sample-rate conversion may be performed during multimedia playback to synchronize an audio stream from the CPU with a video stream from the GPU. However, sample-rate conversion may require a significant amount of processing (e.g., by the CPU and/or another processor) and thus may increase the power consumption of the computer system. In turn, higher power consumption increases the cost of operating the computer system and/or reduces battery life in a portable computer system such as a laptop computer.

Hence, what is needed is a mechanism for facilitating synchronization between interface-connected components in a computer system without the overhead associated with sample-rate conversion of signals transmitted between the components.

SUMMARY

The disclosed embodiments provide a system that facilitates synchronization between a first component and a second component connected to the first component via an interface in a computer system. During an active state of the interface, the system uses a local time base in the second component to generate a local clock signal that tracks a reference clock signal, which for example, can be a bus clock signal or another clock signal that originates from the first component. (We refer to this reference clock signal as a "host clock signal.") Next, during an inactive state of the interface, the system uses the local time base to maintain the local clock signal at the second component. Finally, during a subsequent active state of the interface after the inactive state, the system adjusts the local clock signal to remove clock drift between the local clock signal and the host clock signal.

In some embodiments, adjusting the local clock signal to remove clock drift between the local clock signal and the host clock signal involves:
  (i) calculating the clock drift based on at least one of a phase difference, a frequency difference, and an absolute time difference between the local clock signal and the host clock signal;
  (ii) obtaining one or more lock settings associated with adjustment of the local clock signal; and
  (iii) adjusting a frequency of the local clock signal based on the clock drift and the lock settings.

In some embodiments, each of the lock settings is associated with a synchronization time, a frequency deviation, or a smoothness parameter.

In some embodiments, the frequency is adjusted in an open loop or a closed loop.

In some embodiments, the local time base is a numerically controlled oscillator (NCO) that includes a microelectromechanical systems (MEMS) oscillator and a frequency synthesizer.

In some embodiments, the first component corresponds to a motherboard, and the second component corresponds to a peripheral component.

In some embodiments, the local clock signal facilitates synchronization of an audio signal to a video signal and/or synchronization of multiple audio streams.

BRIEF DESCRIPTION OF THE FIGURES

In the figures, like reference numerals refer to the same figure elements.

DETAILED DESCRIPTION

Figure 1:
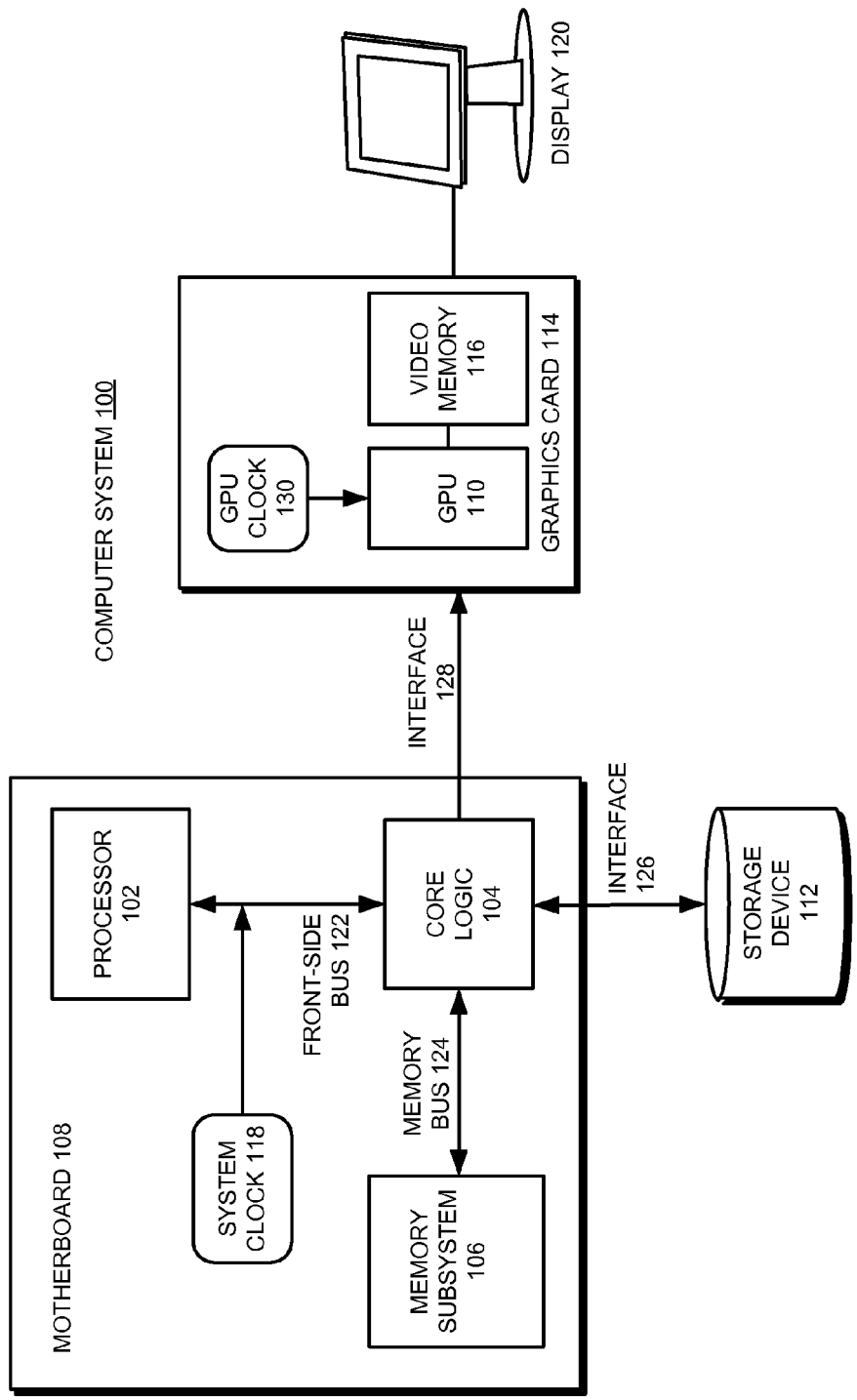
FIG. 1 shows a computer system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known. When the hardware modules or apparatus are activated, they perform the methods and processes included within them.

The disclosed embodiments provide a method and system for facilitating synchronization in a computer system such as a laptop computer, personal computer, media player, and/or workstation. More specifically, the disclosed embodiments provide a method and system for facilitating synchronization between a first component and a second component connected to the first component via an interface in the computer system. For example, the first component may correspond to a motherboard, the second component may correspond to a graphics card, and the interface may correspond to a Peripheral Component Interconnect Express (PCIe) bus.

To synchronize data transfer between the first and second components, a local time base in the second component may be used to generate a local clock signal that tracks a host clock signal from the first component during an active state of the interface (wherein the host clock signal can be a bus clock signal or another clock signal that originates from the first component.) The local time base may correspond to a numerically controlled oscillator (NCO) that contains a microelectromechanical systems (MEMS) oscillator and a frequency synthesizer. The local time base may then be used to maintain the local clock at the second component during an inactive state of the interface. Finally, the local clock signal may be used to remove clock drift between the local clock signal and the host clock signal during a subsequent active state of the interface. In other words, the local time base may allow the second component to synchronize operation with the first component, even if transmission of the host clock signal to the second component is intermittent.

FIG. 1 shows a computer system 100 in accordance with the disclosed embodiments. Computer system 100 may correspond to a personal computer, laptop computer, workstation, media player, and/or other type of electronic data-processing device. As shown in FIG. 1, computer system 100 includes a motherboard 108 containing a processor 102, a bridge chip 104, and an on-board memory subsystem 106 containing semiconductor memory.

Processor 102 may correspond to a central-processing unit (CPU) that is coupled to core logic chip 104 through a bus 122. Core logic chip 104 may enable communication between processor 102 and other components in computer system 100. First, core logic chip 104 may connect processor 102 and memory subsystem 106 through a memory bus 124. Core logic chip 104 may additionally couple processor 102 to a number of peripheral components through various interfaces 126-128 with the components.

In particular, processor 102 may use a first interface 126 to communicate with a storage device 112 containing non-volatile storage (e.g., hard disk drive, optical drive, etc.). For example, processor 102 may send read and write commands to storage device 112 through a Serial Advanced Technology Attachment (SATA) interface with storage device 112. Processor 102 may also use a second interface 128 to communicate with a graphics card 114 containing a graphics-processing unit (GPU) 110. For example, processor 102 may issue graphics-rendering commands to GPU 110 through a Peripheral Component Interconnect Express (PCIe) bus that connects graphics card 114 to motherboard 108. GPU 110 may use the graphics-rendering commands to update video frames in one or more framebuffers located in video memory 116. The video frames may then be used to produce video streams that drive a display 120.

Those skilled in the art will appreciate that computer system 100 may contain multiple clock domains. For example, a system clock 118 may synchronize the execution of components (e.g., processor 102, bridge chip 104, memory subsystem 106) on motherboard 108, while a separate GPU clock 130 may synchronize graphics-processing operations on GPU 110 and/or graphics card 114. As a result, a clock domain crossing may occur during the transmission of data between motherboard 108 and graphics card 114.

A technique such as sample-rate conversion may thus be performed to ensure that signals transmitted over interfaces 126-128 are received properly after crossing clock domains. For example, sample-rate conversion may be performed to synchronize multiple audio streams from different clock domains in computer system 100 and/or to synchronize an audio signal from processor 102 to a video signal from GPU 110 during multimedia playback. However, sample-rate conversion of signals may require additional processing (e.g., by processor 102), and consequently, increase the computational overhead and/or power consumption of computer system 100. (For example, in a case where two clock domains are drifting, sample rate conversion can involve reading from each domain, comparing results, and estimating a conversion ratio. This is an inexact process which involves significant complexity.)

In one or more embodiments, computer system 100 includes functionality to synchronize communication between two interface-connected components (e.g., motherboard 108 and graphics card 114) by tracking a host clock signal from the first component and/or interface (e.g., interfaces 126-128) with a local time base in the second component. In other words, the local time base may generate a local clock signal that allows the second component to execute at the frequency of the host clock signal, and thus at the operating frequency of the first component. For example, the local time base may correspond to a numerically controlled oscillator (NCO) that uses a microelectromechanical systems (MEMS) oscillator and a frequency synthesizer to generate and vary the local clock signal based on the frequency and/or phase of the host clock signal. Because such tracking may be accomplished without incurring computational overhead and/or consuming additional power on processor 102, the local time base may provide a cheaper and/or more efficient mechanism for managing clock domain crossings than sample-rate conversion.

Furthermore, the local time base may include functionality to remove clock drift that occurs between the host clock signal and the local clock signal during inactive periods of the interface. Consequently, the local time base may facilitate synchronization between components in different clock domains, even if timing information (e.g., the host clock signal) is transmitted only intermittently between the components. The use of a local time base to facilitate synchronization between interface-connected components is discussed in further detail below with respect to FIGS. 2-3.

Figure 2:
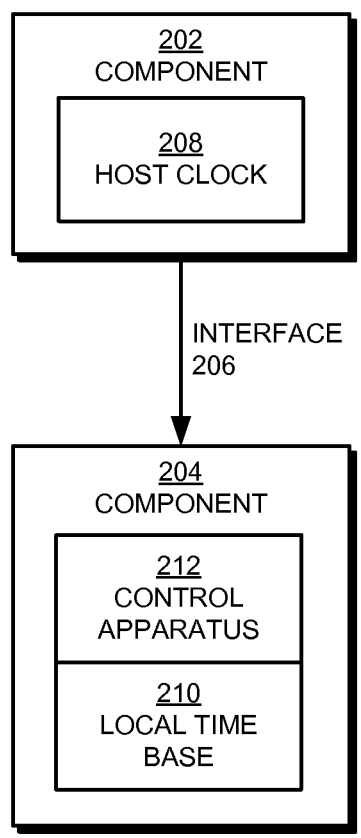
FIG. 2 shows a schematic of a system in accordance with the disclosed embodiments.

FIG. 2 shows a schematic of a system in accordance with the disclosed embodiments. As mentioned above, the system may facilitate synchronization between a first component 202 and a second component 204 connected to the first component over an interface 206. Component 202 may be driven by a host clock 208 (e.g., system clock), while component 204 may be driven by a local time base 210. For example, components 202-204 may be a motherboard and a graphics card on a computer system, respectively. Furthermore, communication between components 202-204 may be driven by a separate clock generator for interface 206. Consequently, data transmission over interface 206 (e.g., a PCIe bus) may be intermittent and involve a clock domain crossing.

To synchronize components 202-204, a control apparatus 212 in component 204 may use a local time base 210 to generate a local clock signal that tracks a host clock signal from component 202 (e.g., host clock 208) and/or interface 206 during an active state of interface 206. For example, control apparatus 212 may lock the local clock signal to an embedded host clock signal during data transmission between components 202-204.

In one or more embodiments, local time base 210 corresponds to an NCO containing a MEMS oscillator and a frequency synthesizer that corrects temperature-based frequency drift in the MEMS oscillator. Such an NCO may be significantly cheaper than an NCO that utilizes a digital-to-analog converter (DAC) and thus may enable the generation of adjustable local clock signals in a variety of peripheral components at low cost. The NCO may also utilize other types of frequency-generating components, such as crystal oscillators and/or variable-frequency clock generator circuits.

Control apparatus 212 may continue to track the host clock signal with the local clock signal, even as intermittent data transmission between components 202-204 causes interface 206 to switch between active and inactive states. In particular, control apparatus 212 may use local time base 210 to maintain the local clock signal at component 204 during an inactive state of interface 206 (e.g., lack of data transmission between components 202-204).

Then, during a subsequent active state of interface 206 (e.g., resumed transmission of data between components 202-204) after the inactive state, control apparatus 212 may adjust the local clock signal to remove clock drift between the local clock signal and the host clock signal. For example, clock drift between the local and host clock signals may result from spread-spectrum generation of the host clock signal by host clock 208 (e.g., to reduce electromagnetic interference (EMI) emission by component 202). Control apparatus 212 may manage the clock drift by adjusting the frequency of the local clock signal until both the phase and frequency of the local clock signal are aligned with those of the host clock signal.

During operation, control apparatus removes of clock drift by comparing the frequencies, phases, and/or absolute times of the local clock signal and the host clock signal. For example, the clock drift may be calculated as a phase difference, frequency difference, and/or absolute time difference between the local clock signal and the host clock signal. Next, control apparatus 212 may obtain one or more lock settings associated with adjustment of local clock signal. Each lock setting may specify a parameter used in the removal of the clock drift from local clock signal. For example, each lock setting may specify a synchronization time over which the clock drift is to be removed, a frequency deviation of each adjustment to the local clock signal, and/or a smoothness parameter governing the removal of clock drift from the local clock signal.

Control apparatus 212 may then send a frequency adjustment for the local clock signal to local time base 210 based on the clock drift and the lock settings. For example, control apparatus 212 may increase and/or decrease the frequency of the local clock signal until the local clock signal is locked to the host clock signal. In addition, control apparatus 212 may adjust the local clock signal in a way that restricts the frequency deviation of each increase and/or decrease, accomplishes the lock within a certain amount of time, and/or removes the clock drift in small, steady increments.

In one or more embodiments, control apparatus 212 adjusts the frequency of the local clock signal in an open loop or a closed loop. For example, control apparatus 212 may operate in an open loop and calculate the clock drift once for each active state of the interface associated with the host clock signal. Control apparatus 212 may then generate a series of frequency adjustments to remove the clock drift from the local clock signal without re-examining the clock drift until the next active state of the interface.

On the other hand, control apparatus 212 may continuously monitor the clock drift in a closed loop whenever the host clock signal is available and may transmit a new frequency adjustment to local time base 210 whenever the clock drift is calculated to be nonzero. For example, FIG. 3 illustrates an exemplary closed loop system wherein control apparatus 212 continuously monitors and adjusts a local time base that generates a local clock signal 302 based on a host clock signal 304 whenever host clock signal 304 is available.

Figure 3:
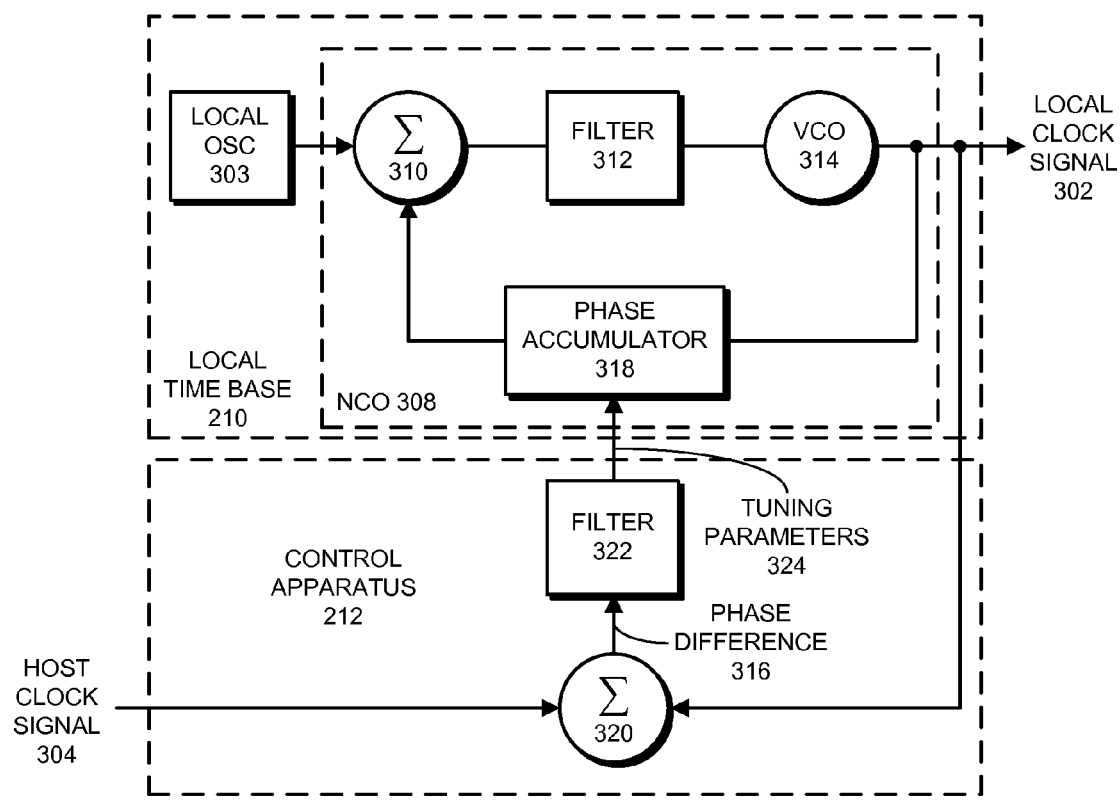
FIG. 3 shows the operation of a control apparatus in accordance with the disclosed embodiments.

As illustrated in FIG. 3, local time base 210 includes a local oscillator 303, which for example can include a crystal oscillator or a MEMs resonator. Local oscillator 303 generates a signal which feeds into a numerically controlled oscillator (NCO) 308 which also receives tuning parameters 324 from control apparatus 212 and uses these inputs to generate local clock signal 302. As illustrated in FIG.3, NCO 308 provides a closed loop which includes a summing junction 310, a filter 312, voltage-controlled oscillator (VCO) 314 and a phase accumulator 318. (Note that NCO 308 can alternatively be implemented using a different type of a synthesizer, such as a fractional N synthesizer, a direct digital synthesizer or a flying adder circuit.)

As illustrated in FIG. 3, control apparatus 212 includes a phase comparator 320 which compares host clock signal 304 with local clock signal 302 to produce a phase difference signal 316. This phase difference signal 316 feeds through a filter 322 to produce tuning parameters 324 that feed into phase accumulator 318. When host clock signal 304 becomes in active, control apparatus 212 freezes tuning parameters 324 so that local clock signal 302 is effectively decoupled from host clock signal 304. When host clock signal 304 becomes active again, control apparatus 212 unfreezes tuning parameters 324. Next, control apparatus 212 can adjust tuning parameters 324 so that local clock signal 302 gradually transitions into alignment with host clock signal 304. Techniques for accomplishing this transition are discussed in related U.S. patent application Ser. No. 12/238,274, entitled "Synchronizing Timing Domains Based on State Variables," by inventor William P. Cornelius, filed on 25 Sep. 2008, which is hereby incorporated by reference.

Figure 4:
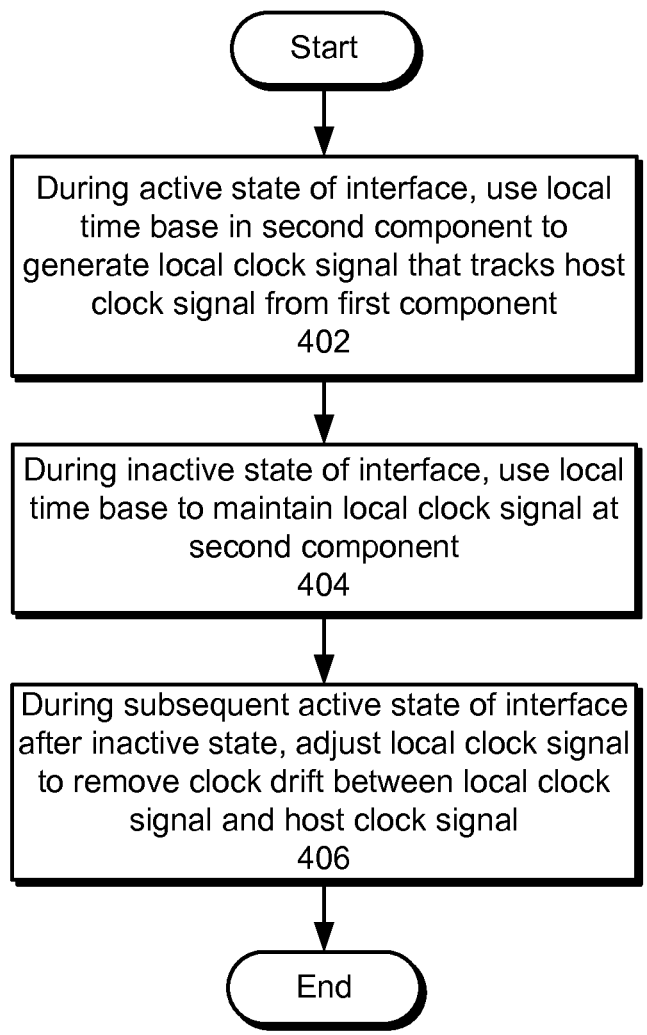
FIG. 4 shows a flowchart illustrating the process of facilitating synchronization between a first component and a second component connected to the first component via an interface in a computer system in accordance with an embodiment.

FIG. 4 shows a flowchart illustrating the process of facilitating synchronization between a first component and a second component connected to the first component via an interface in a computer system in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, during an active state of the interface, a local time base in the second component is used to generate a local clock signal that tracks a host clock signal from the first component (operation 402). The local time base may be an NCO that contains a MEMS oscillator and frequency synthesizer and/or another type of variable frequency generator circuit. By tracking the host clock signal, the local time base may allow the second component to synchronize execution with the first component and/or with communication over the interface. For example, the local time base may enable the synchronization of an audio signal from a CPU with a video signal from a GPU during multimedia playback and/or the synchronization of multiple audio streams (e.g., from different audio devices and/or interfaces) during audio playback.

Next, during an inactive state of the interface, the local time base is used to maintain the local clock signal at the second component (operation 404). For example, the local clock signal may be used to drive a GPU during periods that do not involve the transfer of data and embedded timing information to the GPU over a PCIe bus.

Finally, during a subsequent active state of the interface after the inactive state, the local clock signal is adjusted to remove clock drift between the local clock signal and the host clock signal (operation 406). To remove the clock drift, the clock drift may be calculated based on a phase difference, a frequency difference, and/or an absolute time difference between the local clock signal and the host clock signal. One or more lock settings associated with adjustment of the local clock signal may then be obtained, and the frequency of the local clock signal may be adjusted based on the clock drift and the lock settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating synchronization between a first component and a second component connected to the first component via an interface in a computer system, comprising:
   during an active state of the interface, using a local time base in the second component to generate a local clock signal that tracks a host clock signal from the first component, wherein the local time base includes a phase-locked loop, which includes a phase comparator that determines a phase difference between the host clock signal and the local clock signal, wherein the phase difference feeds through a filter to produce tuning parameters that feed into a phase accumulator, which is part of a numerically controlled oscillator (NCO) that also receives a timing signal from a local oscillator to produce the local clock signal;
   during an inactive state of the interface when the host clock signal becomes inactive, using the local time base to maintain the local clock signal at the second component by halting the feeding of the tuning parameters into the phase accumulator so that the local clock signal is effectively decoupled from the host clock signal; and
   during a subsequent active state of the interface when the host clock signal becomes active again, starting the feeding of the tuning parameters into the phase accumulator so that the local clock signal resumes tracking the host clock signal, and adjusting the local clock signal to remove clock drift between the local clock signal and the host clock signal.

2. The method of claim 1, wherein adjusting the local clock signal to remove clock drift between the local clock signal and the host clock signal involves:
   calculating the clock drift based on at least one of a phase difference, a frequency difference, and an absolute time difference between the local clock signal and the host clock signal;
   obtaining one or more lock settings associated with adjustment of the local clock signal; and
   adjusting a frequency of the local clock signal based on the clock drift and the lock settings.

3. The method of claim 2, wherein each of the lock settings is associated with at least one of:
   a synchronization time;
   a frequency deviation; and
   a smoothness parameter.

4. The method of claim 2, wherein the frequency is adjusted in an open loop or a closed loop.

5. The method of claim 1, wherein the NCO comprises:
   a microelectromechanical systems (MEMS) oscillator; and
   a frequency synthesizer.

6. The method of claim 1,
   wherein the first component corresponds to a motherboard, and
   wherein the second component corresponds to a peripheral component.

7. The method of claim 1, wherein the local clock signal facilitates at least one of:
   synchronization of an audio signal to a video signal; and
   synchronization of multiple audio streams.

8. A system for facilitating synchronization between a first component and a second component connected to the first component via an interface in a computer system, comprising:
   a local time base in the second component; and
   a control apparatus configured to:
      during an active state of the interface, use the local time base to generate a local clock signal that tracks a host clock signal from the first component, wherein the local time base includes a phase-locked loop, which includes a phase comparator that determines a phase difference between the host clock signal and the local clock signal, wherein the phase difference feeds through a filter to produce tuning parameters that feed into a phase accumulator, which is part of a numerically controlled oscillator (NCO) that also receives a timing signal from a local oscillator to produce the local clock signal;
      during an inactive state of the interface when the host clock signal becomes inactive, use the local time base to maintain the local clock signal at the second component by halting the feeding of the tuning parameters into the phase accumulator so that the local clock signal is effectively decoupled from the host clock signal; and
      during a subsequent active state of the interface when the host clock signal becomes active again, starting the feeding of the tuning parameters into the phase accumulator so that the local clock signal resumes tracking the host clock signal, and adjust the local clock signal to remove clock drift between the local clock signal and the host clock signal.

9. The system of claim 8, wherein adjusting the local clock signal to remove clock drift between the local clock signal and the host clock signal involves:
 calculating the clock drift based on at least one of a phase difference, a frequency difference, and an absolute time difference between the local clock signal and the host clock signal;
 obtaining one or more lock settings associated with adjustment of the local clock signal; and
 adjusting a frequency of the local clock signal based on the clock drift and the lock settings.

10. The system of claim 9, wherein each of the lock settings is associated with at least one of:
 a synchronization time;
 a frequency deviation; and
 a smoothness parameter.

11. The system of claim 9, wherein the frequency is adjusted in an open loop or a closed loop.

12. The system of claim 8, wherein the NCO comprises:
 a microelectromechanical systems (MEMS) oscillator; and
 a frequency synthesizer.

13. The system of claim 8,
 wherein the first component corresponds to a motherboard, and
 wherein the second component corresponds to a peripheral component.

14. The system of claim 13, wherein the peripheral component is a graphics card.

15. The system of claim 8, wherein the local clock signal facilitates at least one of:
 synchronization of an audio signal to a video signal; and
 synchronization of multiple audio streams.

16. A non-transitory computer-readable storage medium storing instructions that when executed by a computer cause the computer to perform a method for facilitating synchronization between a first component and a second component connected to the first component via an interface in a computer system, the method comprising:
 during an active state of the interface, using a local time base in the second component to generate a local clock signal that tracks a host clock signal from the first component, wherein the local time base includes a phase-locked loop, which includes a phase comparator that determines a phase difference between the host clock signal and the local clock signal, wherein the phase difference feeds through a filter to produce tuning parameters that feed into a phase accumulator, which is part of a numerically controlled oscillator (NCO) that also receives a timing signal from a local oscillator to produce the local clock signal;
 during an inactive state of the interface when the host clock signal becomes inactive, using the local time base to maintain the local clock signal at the second component by halting the feeding of the tuning parameters into the phase accumulator so that the local clock signal is effectively decoupled from the host clock signal; and
 during a subsequent active state of the interface when the host clock signal becomes active again, starting the feeding of the tuning parameters into the phase accumulator so that the local clock signal resumes tracking the host clock signal, and adjusting the local clock signal to remove clock drift between the local clock signal and the host clock signal.

17. The non-transitory computer-readable storage medium of claim 16, wherein adjusting the local clock signal to remove clock drift between the local clock signal and the host clock signal involves:
 calculating the clock drift based on at least one of a phase difference, a frequency difference, and an absolute time difference between the local clock signal and the host clock signal;
 obtaining one or more lock settings associated with adjustment of the local clock signal; and
 adjusting a frequency of the local clock signal based on the clock drift and the lock settings.

18. The non-transitory computer-readable storage medium of claim 17, wherein each of the lock settings is associated with at least one of:
 a synchronization time;
 a frequency deviation; and
 a smoothness parameter.

19. The non-transitory computer-readable storage medium of claim 17, wherein the frequency is adjusted in an open loop or a closed loop.

20. The non-transitory computer-readable storage medium of claim 16, wherein the NCO comprises:
 a microelectromechanical systems (MEMS) oscillator; and
 a frequency synthesizer.

21. The non-transitory computer-readable storage medium of claim 16,
 wherein the first component corresponds to a motherboard, and
 wherein the second component corresponds to a peripheral component.

22. The non-transitory computer-readable storage medium of claim 16, wherein the local clock signal facilitates at least one of:
 synchronization of an audio signal to a video signal; and
 synchronization of multiple audio streams.

* * * * *